United States Patent [19]

Danner

[11] 3,994,508

[45] Nov. 30, 1976

[54] SAIL CONTROL APPARATUS FOR VEHICLES

[76] Inventor: Carl L. Danner, 12609 211th St., Lakewood, Calif. 90715

[22] Filed: Apr. 11, 1975

[21] Appl. No.: 567,196

[52] U.S. Cl. .............................. 280/213; 114/102
[51] Int. Cl.² ........................................ B62D 57/04
[58] Field of Search ........... 280/213; 114/90, 97–99, 114/102, 103; 296/78.1

[56] References Cited
UNITED STATES PATENTS

| 578,411 | 3/1897 | Lotherington | 280/213 |
|---|---|---|---|
| 639,107 | 12/1899 | Sorensen | 280/213 |
| 947,731 | 1/1910 | Couder | 280/213 |
| 2,038,166 | 4/1936 | Deal | 280/213 |
| 3,090,340 | 5/1963 | McCutchen | 114/102 |

FOREIGN PATENTS OR APPLICATIONS

| 883,258 | 6/1943 | France | 280/213 |
|---|---|---|---|
| 21,468 | 3/1903 | United Kingdom | 280/213 |

Primary Examiner—Robert R. Song
Assistant Examiner—Terrance L. Siemens
Attorney, Agent, or Firm—Noel B. Hammond

[57] ABSTRACT

A sail arrangement having a hollow flexible boom with a short stiffener rod disposed therein near the forward end, and a stiffener tube which may be moved along the exterior of the boom. The flexible boom provides both automatic sail positioning and the spilling of excess wind during sudden strong gusts. In a second embodiment, a pivoted rigid boom is controlled by an elastic cord. In a third embodiment, a spring assembly permits the mast to pivot to spill the wind during strong gusts.

23 Claims, 10 Drawing Figures

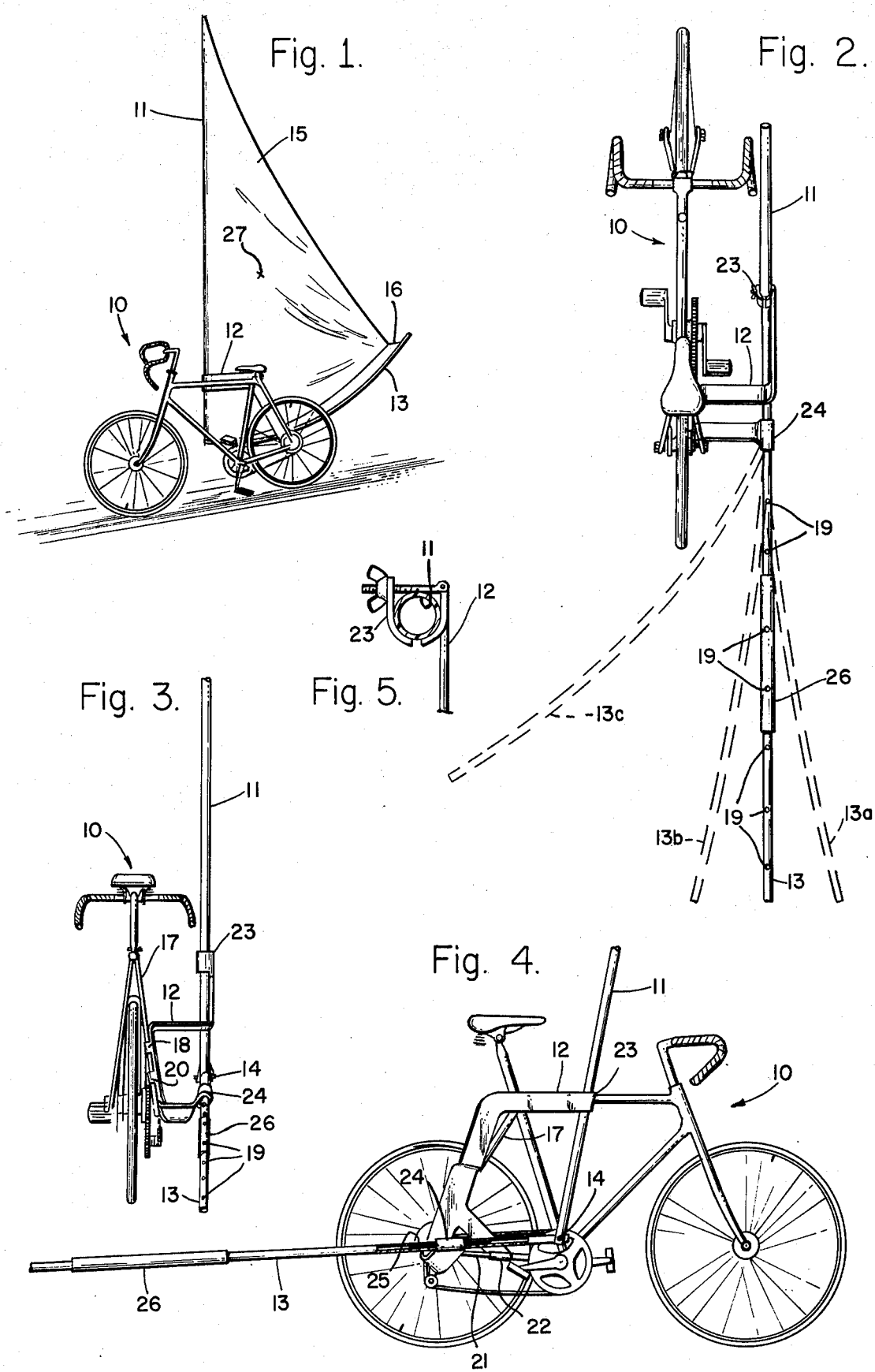

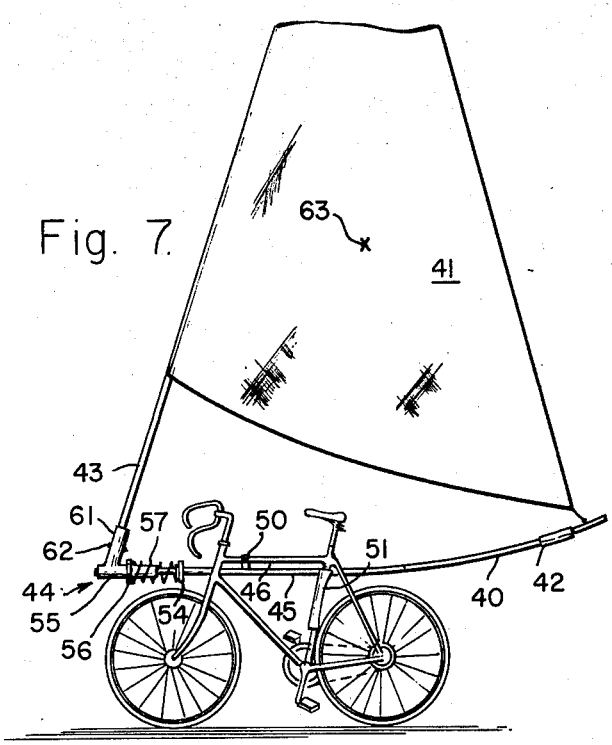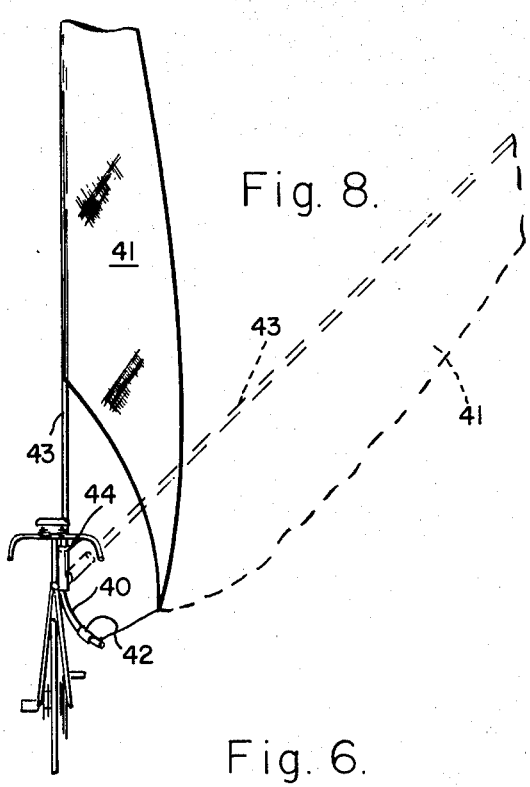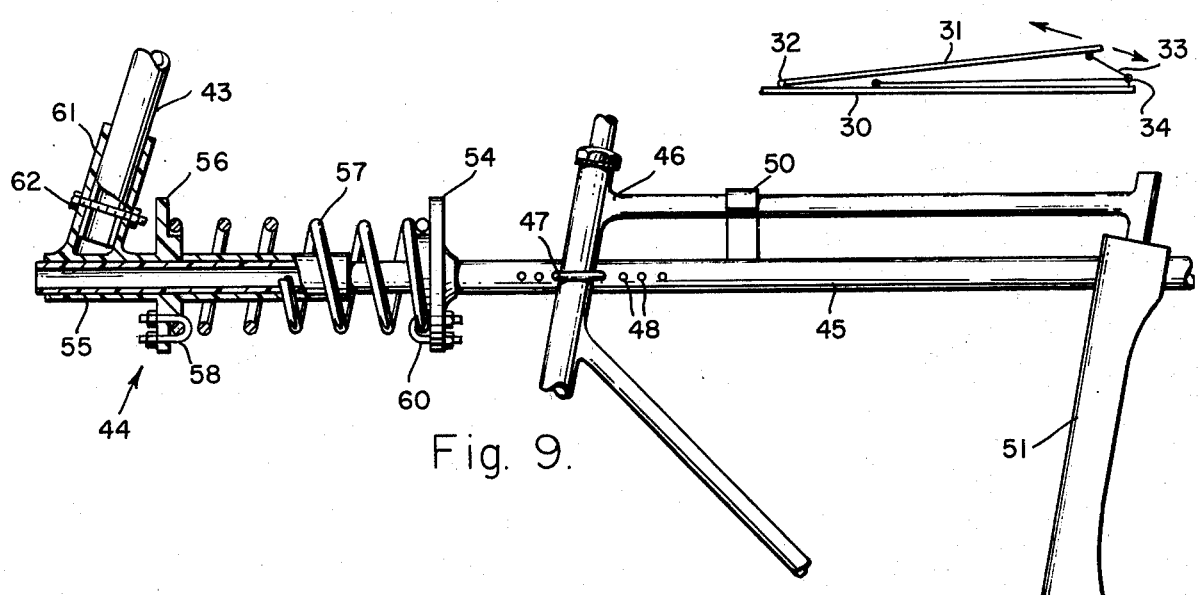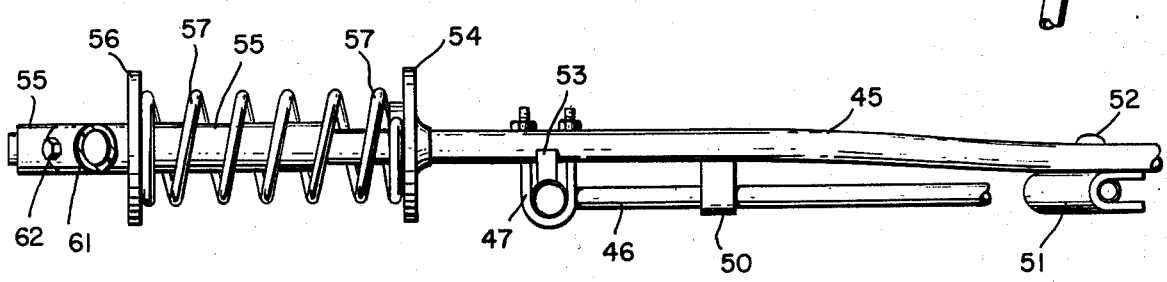

SAIL CONTROL APPARATUS FOR VEHICLES

FIELD OF THE INVENTION

This invention relates to sail vehicles, and more particularly to an improved sail control apparatus for vehicles such as bicycles, land sailers, boats, and the like.

BACKGROUND OF THE INVENTION

Prior vehicle sails are generally complicated, require manual control of the boom, and make the vehicle unstable. Prior sail bicycles have the sail poorly located with respect to the center of effort, so that a gust of wind tends to pivot the bicycle upwind or downwind. Conventional sail vehicles employ a rigid boom and provide no means for spilling the wind, so that the vehicle tends to tip over during sudden gusts of wind.

It is, therefore, an object of the present invention to provide a simple vehicle sail arrangement which does not require manual control of the boom.

Another object of the invention is the provision of a sail arrangement which spills the wind during sudden strong gusts.

Yet another object of the invention is to provide a vehicle sail arrangement of simple construction which is easy to operate.

A further object of the present invention is to provide a sail having a low center of effort to increase the stability of the vehicle.

SUMMARY OF THE INVENTION

In accordance with these and other objects of the invention, there is provided in a first embodiment of the invention a sail mounted to a rigid mast which is tilted slightly to the front. A flexible, hollow boom projects from the rear of the bicycle, and the clew of the sail is fastened thereto by a chain in such a manner that the end of the boom is flexed upwardly. During tacks and jibs when the position of the bicycle is changed with respect to the wind direction, the boom flexes from side to side to let the sail swing. During strong gusts of wind, the boom flexes far to the side to permit the sail to spill the wind. The hollow boom is provided with an internal stiffener rod at its mounting point and has a slidable hollow stiffener tube around it which may be moved along the boom to adjust the flexibility thereof in accordance with wind velocity.

In a second embodiment, a pivoted rigid boom is controlled by an elastic cord so that it is free to pivot from side to side during tacking, and the elastic cord permits the boom to spill the wind during sudden strong gusts.

In a third embodiment of the invention, a flexible boom is used along with a pivoting mast to spill excess wind. The mast is held by an assembly which permits the mast to pivot against spring pressure to spill the wind in a controlled manner during sudden gusts of high wind.

Thus the invention contemplates resilient means to permit the sail to automatically position itself from side to side during tacking, and resilient means to automatically spill the wind during sudden gusts of high wind. Furthermore, when used on a bicycle, the sail is positioned to provide a low center of effort aligned vertically with the rear axle to increase the stability of the bicycle.

BRIEF DESCRIPTION OF THE DRAWINGS

The foregoing and other objects and features of the present invention can be more readily understood with reference to the following detailed description, taken in conjunction with the accompanying drawings, wherein like reference numerals designate like structural elements, and in which FIG. 1 is a perspective view of a bicycle having a first embodiment of the improved sail control apparatus of the present invention, having a flexible boom attached thereto;

FIG. 2 is a top view of the bicycle and flexible boom arrangement of FIG. 1;

FIG. 3 is a rear view of the bicycle and sail arrangement of FIGS. 1 and 2;

FIG. 4 is a side view of the bicycle and sail arrangement of FIGS. 1-3;

FIG. 5 is an enlarged view of the clamp used to hold the mast;

FIG. 6 is a side view of a second embodiment of the invention in which a pivoted rigid boom is controlled by an elastic cord;

FIG. 7 is a side view of a bicycle having a third embodiment of the improved sail arrangement of the present invention attached thereto;

FIG. 8 is a rear view of the bicycle of FIG. 7 illustrating the pivoting of the sail to one side;

FIG. 9 is a side view of a portion of the sail arrangement of FIGS. 7 and 8 showing the attachment to the bicycle and the construction of the spring mounting assembly; and FIG. 10 is a top view of the portion of the sail arrangement shown in FIG. 9.

DETAILED DESCRIPTION OF THE INVENTION

Although the improved sail arrangement of the present invention is described herein with reference to use on a bicycle by way of example, it is to be clearly understood that the principles of the invention are applicable to sail vehicles other than bicycles, such as land sailers and boats, for example. The invention has been shown and described in connection with bicycles because it is a worst case situation. A bicycle has less stability than land sailers and sailboats and the like, and therefore it should be obvious that the principles of the invention can be easily applied to such other more stable vehicles.

Referring now to FIG. 1 of the drawings, a conventional bicycle 10 is shown equipped with a first exemplary embodiment of the improved sail control apparatus constructed in accordance with the present invention. A mast 11 is mounted to a bracket 12 which is rigidly fastened to the bicycle 10. The mast 11 may be approximately 11 feet high and tapered from about 2 inches in diameter at the bottom to about 1 inch in diameter at the top.

A flexible, hollow boom 13 is also mounted to the bracket 12 and extends out behind the rear wheel of the bicycle 10, generally parallel with the ground. The boom 13 may be approximately 90 inches in length and 1 inch in diameter, and may be made of a section of heavy duty plastic water pipe, or the like. The mast 11 is bifurcated at the bottom and engages the forward end of the boom 13, and is fixed thereto by a bolt 14 which passes through holes in the end of the mast 11 and boom 13.

The sail 15 is of triangular shape, having an area of about 40 square feet, and may be a conventional sabot sail or the like. The clew of the sail 15 is fastened to the boom 13 by a chain 16. A series of holes 19, approximately ⅜ inch in diameter, are provided along the top of the boom 13 at 6-inch intervals. The chain 16 hooks into one of these holes 19. The mast 11 is mounted so that it is tilted forward 10° or 15° to apply tension to the boom 13, the end of which flexes upwardly approximately 2 feet.

The bracket 12 is clamped to the bicycle 10 along the frame member 17 which extends upwardly from the rear axle toward the seat by means of two clamps 18, 20. In addition, the bracket 12 has a branch which extends forward as a brace and is clamped to the frame member 21 which extends from the rear axle toward the drive sprocket wheel, by means of a third clamp 22. The bracket 12 is fairly rigid and is rigidly mounted to the bicycle 10. It may be made of aluminum 3½ inches wide and 5/16 inch thick, or the like.

The bracket 12 is bent outwardly at the bottom to avoid interference with the derailleur gear shifting mechanism, if the bicycle 10 is so equipped, and the forward clamp 22 has a slot to permit the passage of the derailleur cable.

The bracket 12 extends away from the bicycle 10 approximately 12 inches in the area where the mast 11 and boom 13 are mounted thereto. This holds the sail 15 away far enough from the bicycle 10 so that there is sufficient room for the rider to get on and operate the bicycle 10. The mast 11 is clamped to the bracket 12 by a clamp 23, and the boom 13 is clamped thereto by a clamp 24. A detail view of the clamp 23 which holds the mast 11 is shown in FIG. 5. Note that the clamp 23 does not completely encircle the mast 11, thereby permitting the sail 15 to pass therethrough.

The hollow boom 13 is provided with a stiffener rod 25 in the interior thereof at the mounting point. The stiffener rod 25 may be an aluminum rod, or the like, about ¾ inch in diameter, and may be fastened within the boom 13 by any convenient means, such as a screw. The boom 13 is also provided with an exterior stiffener tube 26 approximately 3 feet long and 1 inch inside diameter, which is slidable along the boom 13. The stiffener tube 26 may be made of fiber glass or the like, and is manually moved to a desired position along the boom 13 to adjust the flexibility thereof in accordance with wind velocity.

The series of holes 19 in the boom 13 also pass through the stiffener tube 26 so that the clew of the sail 15 can be hooked to the boom 13 when the stiffener tube 26 is positioned to the front or to the rear. When the stiffener tube 26 is in its forwardmost position, it telescopes over the stiffener rod 25 located within the boom 13. This effectively holds the tube 26 and the boom 13 rigid. The rear part of the boom 13 still flexes to some degree, however, and will spill some wind, although not as much as before moving the tube 26 forward.

Referring now to FIG. 2, during tacks and jibs when the position of the bicycle 10 is changed with respect to the wind direction, the boom 13 flexes from side to side as indicated by the dashed outlines 13a and 13b. In strong gusts of wind, the boom 13 flexes markedly to spill the wind from the sail 15, as indicated by the dashed outline 13c. In this position, the sail 15 spills much of the driving force of the wind which would otherwise tend to push over the bicycle 10.

Referring now to FIG. 1, the center of effort of the sail 15 is indicated at 27.

"The wind action on a sail which provides the driving force on a sailing craft distributes that force over the entire area of a sail, but for purposes of analysis it may be considered as a single force applied at a point called the center of effort. The position of this center vertically and also in a fore-and-aft direction is of some importance."

Olson's Small Boat Seamanship, by Louis B. Olson, D. Van Nostrand Company, Inc., pp. 103–104.

In the arrangement of the present invention, the low position of the sail 15 makes it possible to keep the center of effort quite low, which makes it less likely that the bicycle 10 will tip over. Also, the center of effort 27 is located vertically above the rear axle of the bicycle 10 to eliminate the tendency of the driving force of the wind to pivot the bicycle 10 upwind or downwind.

This sail arrangement can be used with most standard bicycles without modification and can be constructed to mount on either the left side or the right side of the bicycle. It has been designed to accommodate derailleur model bicycles, although it may also be used on other types of bicycles. This sail arrangement makes it easy for the rider to get on the bicycle 10, because there is sufficient room for him to stand beside the bicycle 10 and swing his leg over it, just as is normally done when getting on a bicycle. Also, there is sufficient clearance so that the rider can pedal without having his feet hit the sail 15 or the sail mounting bracket 12.

This sail arrangement is simple in construction and is easy to attach to, and to remove from, the bicycle 10. It is simple to operate and does not employ any control cables for the boom, or any reels or winches to wind up the cables, as many prior art sail bicycles require. The flexible boom 13 automatically swings from side to side by itself during tacking without any manual control. The position of the boom stiffener tube 26 is adjusted only once for any given sailing conditions. The sail 15 is easily removed or folded for storage when there is no wind, and is easily reefed for sailing in strong winds by rolling it up on the mast 11.

Rolling of the sail 15 is permitted by the clamp 23 that holds the mast 11. The clew of the sail 15 moves forward during reefing, and the chain 16 is unhooked from one hole 19 and hooked into another more appropriate hole 19. Also, the mast 11 can be easily pivoted down to pass under low bridges.

This arrangement is safe because the rider has good visibility, and the center of effort 27 of the sail 15 is in line with the rear axle so that the bicycle 10 can be easily controlled and balanced. If the center of effort 27 were ahead of or behind the rear axle, strong gusts of wind would tend to pivot the bicycle 10. There is sufficient sail area to move the bicycle 10 at a respectable speed in light breezes, and the flexible boom 13 spills wind pressure during sudden gusts of high wind, making it unlikely that the bicycle 10 will tip over.

The flexible boom 13 serves as a means for letting the sail 15 swing from side to side, and as a means for spilling the wind. Means other than a flexible boom may be used to perform these functions, as for example a rigid, pivoted boom controlled by a spring.

FIG. 6 illustrates a second embodiment of the present invention in which resilient means is employed for automatically positioning the sail. A rigid support member 30, which is attached to the bicycle, supports one end of a rigid boom 31 by means of a pivot 32. One end of an elastic cord 33 is fastened to the midsection of the support member 30, extends along the support member 30, and passes through an eye 34 disposed at the outer end thereof, and fastens to the free end of the rigid boom 31.

As indicated by the arrows in FIG. 6, the rigid boom 31 is free to pivot from side to side automatically during tacking. The elastic cord 33 also permits the rigid boom 31 to swing far enough to spill the wind pressure during sudden gusts of high wind. Although not shown, the cord 33 may be fastened at various points on the support member 30 by putting fastening points along the length thereof. This would provide a measure of control over the amount of sail movement.

It should be understood that in each of the embodiments of the present invention it is desired to permit the sail to automatically position itself within about a 10° range on each side of the straight back position except when it is spilling excess wind. This is to keep the forward pushing force component near a maximum with respect to the side force component. It is not desirable to keep the forward force at an absolute maximum, since to do so would entail keeping the side force at a maximum also.

In the foregoing embodiments, the spilling of excess wind pressure is accomplished by permitting the sail to automatically position itself within about a 45° range on each side of the straight back position. In the embodiment about to be described, excess wind is spilled by permitting the sail to automatically position itself within about a 90° range on each side of the vertical position.

FIG. 7 shows a third embodiment of the invention which employs a pivoting mast to spill excess wind. A flexible boom 40 of the type described in connection with the embodiment of FIGS. 1–4 is used to permit the sail 41 to automatically swing from side to side during tacking. The boom 40 is provided with the same type of internal stiffener rod (not shown) and external stiffener tube 42. The mast 43, however, is held by a spring mounting assembly 44 so that during sudden gusts of high wind, it pivots to the side to spill the wind, as shown in FIG. 8. The spring mounting assembly 44 permits the mast 43 to pivot to either side, depending on the wind direction.

The spring mounting assembly 44 is shown in more detail in FIGS. 9 and 10. It is disposed on the forward end of a tubular member 45 which is mounted to the bicycle frame 46. The flexible boom 40 is fastened to the other end of the tubular member 45. A U-bolt 47 engages the forward vertical portion of the bicycle frame 46 and is fastened through holes 48 provided in the tubular member 45. A series of these holes 48 is provided so that adjustments in positioning may be made.

A hook 50, which is rigidly attached to the tubular member 45 as by welding, extends upward and hooks over the upper horizontal cross member of the bicycle frame 46. A U-shaped bracket 51 is rigidly attached to the tubular member 45, as by means of a bolt 52, and engages the rear vertical post of the bicycle frame 46. If desired, a clamp may be disposed on the post below the bracket 51 to prevent the bracket 51 from sliding down.

The tubular member 45 is provided with a slight bend so that it is spaced away from the bicycle frame 46 at the forward end. A 1-inch rubber spacer 53 is clamped between the tubular member 45 and the forward vertical portion of the bicycle frame 46 to prevent the brake cables from hitting the sail attachment when turning.

The spring mounting assembly 44 comprises an annular spring mount 54 which is rigidly fastened to the tubular member 45, as by welding. A tubular rotating member 55 is slipped over the end of the tubular member 45 for rotation thereon, and includes an annular spring mount 56 rigidly fastened thereto. A helical coil spring 57 extends between the two annular spring mounts 54, 56, and is fastened thereto by means of U-bolts 58, 60.

A cylindrical sleeve 61 is fastened to the rotating member 55 as by welding, and receives the mast 43 which is fastened therein by means of a bolt 62. In this manner, as wind pressure on the sail 41 causes the mast 43 to tend to pivot toward one side or the other, the rotating member 55 rotates on the tubular member 45 against the pressure of the spring 57. Thus, the sail 41 is permitted to spill the wind in a controlled manner during sudden gusts of high wind. In FIG. 7 it may be seen that the center of effort 63 is aligned vertically above the rear axle of the bicycle.

It should be understood that although the invention has been described with reference to sail arrangements employing a boom, it is contemplated that the principles of the present invention may be applied to other types of sail arrangements such as jib sails and spinnaker sails which do not use a boom. By way of example, an elastic cord could be fastened to the corner of the free end of a jib sail so that the sail could swing back and forth for automatic sail positioning or for automatically spilling excess wind.

Furthermore, it is contemplated that the principles of the invention may be employed with other vehicles than bicycles, such as land sailers, boats, and the like. Use of the present invention with land sailers or the like would enable larger sails to be used because of the increased stability.

Thus, there have been shown and described several embodiments of a simple sail control apparatus which does not require manual control of the boom, which is easy to operate, and which spills the wind during sudden strong gusts.

It is to be understood that the above-described embodiments of the invention are merely illustrative of the many possible specific embodiments which represent applications of the principle of the present invention. Numerous and varied other arrangements can be readily devised in accordance with these principles by those skilled in the art without departing from the spirit and scope of the invention.

What is claimed is:
1. A sail bicycle comprising:
   a bicycle;
   a mounting member attached to the frame of said bicycle;
   boom means attached to said mounting member and including resilient means for permitting varying amounts of controlled automatic sideward movement of a sail in response to the force of the wind;
   mast mounting means attached to said mounting member;
   a mast attached to said mast mounting means; and
   a sail attached to said mast and to said boom means, said sail being disposed with its center of effort substantially aligned in a vertical plane passing through the rear axle of said bicycle.

2. The sail bicycle of claim 1 wherein said mounting member is a bracket having laterally extending members which extend to one side of the frame of said bicycle, said resilient means being a hollow flexible boom attached to one of said laterally extending members, said boom extending generally parallel to said bicycle but spaced away therefrom and extending to the rear thereof, a short stiffener rod being disposed within said boom at the end attached to said bracket; and a stiffener tube being disposed on said boom and slideable therealong.

3. The sail bicycle of claim 1 wherein said boom means includes a rigid boom attached by a pivot to said mounting member, a guide member being attached to said mounting member and having an eye disposed near the outer end of said boom, said resilient means being an elastic cord having one end attached to said guide member, said cord passing through said eye, the other end of said cord being attached to the outer end of said boom.

4. The sail bicycle of claim 1 wherein said mounting member is a tubular member attached to the frame of said bicycle and disposed longitudinally therealong, said mast mounting means being a spring-controlled rotary mounting assembly rotatably mounted on the forward end of said tubular member.

5. A sail bicycle comprising:
a bicycle;
a bracket attached to said bicycle and having laterally extending members which extend to one side of the frame of said bicycle;
a hollow flexible boom attached to one of said laterally extending members, said boom extending generally parallel to said bicycle but spaced away therefrom and extending to the rear thereof;
a short stiffener rod disposed within said boom at the end attached to said bracket;
a stiffener tube disposed on said boom and slidable therealong;
a mast attached to one of said laterally extending members; and
a sail attached to said mast and having its clew attached to said boom, said boom being flexed upwardly, said sail being disposed generally parallel to said bicycle but spaced away therefrom, and having its center of effort substantially in vertical alignment with the rear axle of said bicycle.

6. A sail bicycle comprising:
a bicycle;
a bracket attached to said bicycle and having laterally extending members which extend to one side of the frame of said bicycle;
a rigid boom attached by a pivot to one of said laterally extending members, said boom extending generally parallel to said bicycle but spaced away therefrom and extending to the rear thereof;
a guide member attached to said bracket and having an eye disposed near the outer end of said boom;
an elastic cord having one end attached to said guide member, said cord passing through said eye, the other end of said cord being attached to the outer end of said boom;
a mast attached to one of said laterally extending members and extending at an angle forward of vertical; and
a sail attached to said mast and having its clew attached to said boom, said sail being disposed generally parallel to said bicycle but spaced away therefrom, and having its center of effort substantially in vertical alignment with the rear axle of said bicycle.

7. A sail bicycle comprising:
a bicycle;
a tubular member attached to the frame of said bicycle and disposed longitudinally therealong;
a hollow flexible boom attached to the rear end of said tubular member and extending to the rear of said bicycle;
a short stiffener rod disposed within said boom at the end attached to said tubular member;
a stiffener tube disposed on said boom and slidable therealong;
a spring-controlled rotary mounting assembly rotatably mounted on the forward end of said tubular member;
a mast attached to said rotary mounting assembly; and
a sail attached to said mast and having its clew attached to said boom, said boom being flexed upwardly, said sail being disposed with its center of effort substantially in vertical alignment with the rear axle of said bicycle.

8. An improvement in sail bicycles of the type having a mast and a boom mounted to a bicycle, and a sail fastened to said mast and said boom, wherein the improvement comprises: said boom being a flexible boom permitting varying amounts of automatic sideward movement of said sail in proportion to the force of the wind, whereby said flexible boom swings from side to side during tacking and spills the wind during sudden strong gusts.

9. The apparatus of claim 8 in which said flexible boom is hollow and contains a stiffener rod therein at the end fastened to said bicycle.

10. The apparatus of claim 8 in which a stiffener tube is disposed over said flexible boom and slideable therealong.

11. An improvement in sail bicycles of the type having a mast and a boom mounted to a bicycle, and a sail fastened to said mast and said boom, wherein the improvement comprises: automatic means disposed on said bicycle for permitting varying amounts of sideward movement of said sail in proportion to the force of the wind; said means for permitting sideward movement of said sail being a flexible boom and a resilient mounting assembly for mounting said mast which permits said mast to pivot to one side during sudden strong gusts of wind.

12. An improvement in sail bicycles of the type having a mast and a boom mounted to a bicycle, and a sail fastened to said mast and said boom, wherein the improvement comprises: automatic means disposed on said bicycle for permitting varying amounts of sideward movement of said sail in proportion to the force of the wind; said sail being located to have a low center of effort aligned vertically with the rear axle of said bicycle.

13. Automatic sail control apparatus for a land vehicle having a mast and a sail comprising:
a flexible boom for attachment to said sail and said land vehicle for permitting varying amounts of automatic sideward movement of said sail in response to the varying force of the wind exerted on said sail.

14. The apparatus of claim 13 in which said flexible boom is hollow and contains a stiffener rod therein at the end fastened to said land vehicle.

15. The apparatus of claim 13 in which a stiffener tube is disposed over said flexible boom and slideable therealong.

16. Sail control apparatus for use on a land vehicle of the type having a mast mounted thereon, and a sail fastened to said mast, said sail control apparatus comprising: a flexible boom for attachment to said vehicle and to said sail for permitting varying amounts of automatic sideward movement of said sail in proportion to the force of the wind, whereby said flexible boom swings from side to side during tacking and spills the wind during sudden strong gusts.

17. The apparatus of claim 16 in which said flexible boom is hollow and contains a stiffener rod therein at the end of which attaches to said vehicle.

18. The apparatus of claim 16 in which a stiffener tube is adapted to be disposed over said flexible boom and to be slideable therealong.

19. Sail control apparatus for use on a land vehicle of the type having a mast mounted thereon, and a sail fastened to said mast, said sail control apparatus comprising: automatic means for permitting varying amounts of sideward movement of said sail in proportion to the force of the wind; said means for permitting sideward movement of said sail being a flexible boom and a resilient mounting assembly for mounting said mast which permits said mast to pivot to one side during sudden strong gusts of wind.

20. Sail control apparatus for use on a land vehicle of the type having a mast; a sail fastened to said mast, and front and rear land contact points, said sail control apparatus comprising: automatic means for permitting varying amounts of sideward movement of said sail in proportion to the force of the wind, said sail being located to have a low center of effort aligned vertically with the rear land contact point of said vehicle.

21. A flexible boom for use on a land vehicle of the type having a mast and a sail fastened to said mast for permitting varying amounts of automatic sideward movement of said sail in proportion to the force of the wind, whereby said flexible boom swings from side to side during tacking and spills the wind during sudden strong gusts.

22. The apparatus of claim 21 in which said flexible boom is hollow and contains a stiffener rod therein at the end which is adapted to be attached to said vehicle.

23. The apparatus of claim 21 in which a stiffener tube is adapted to be disposed over said flexible boom and to be slideable therealong.

* * * * *